(12) United States Patent
Remy et al.

(10) Patent No.: US 10,870,596 B2
(45) Date of Patent: Dec. 22, 2020

(54) AERATED REACTOR WITH INTERNAL SOLIDS SEPARATION

(71) Applicant: Paques I.P. B.V., Balk (NL)

(72) Inventors: Maxime José Jean Remy, Balk (NL); Rienk Prins, Balk (NL); Jacob Cornelis Theodorus Vogelaar, Balk (NL)

(73) Assignee: PAQUES I.P. B.V., Balk (NL)

( * ) Notice: Subject to any disclaimer, the term of this patent is extended or adjusted under 35 U.S.C. 154(b) by 0 days.

(21) Appl. No.: 16/442,115

(22) Filed: Jun. 14, 2019

(65) Prior Publication Data

US 2019/0292081 A1    Sep. 26, 2019

Related U.S. Application Data

(63) Continuation of application No. PCT/EP2017/083398, filed on Dec. 18, 2017.

(30) Foreign Application Priority Data

Dec. 16, 2016 (EP) .................................... 16204837

(51) Int. Cl.
*C02F 3/30* (2006.01)
*B01D 21/00* (2006.01)
(Continued)

(52) U.S. Cl.
CPC .......... *C02F 3/307* (2013.01); *B01D 21/0045* (2013.01); *C02F 1/006* (2013.01);
(Continued)

(58) Field of Classification Search
CPC .......... C02F 3/307; C02F 1/006; C02F 3/223; C02F 2101/16; C02F 2203/006;
(Continued)

(56) References Cited

U.S. PATENT DOCUMENTS 7,850,849 B2    12/2010 Dos Santos Alves et al.
9,102,548 B2 *   8/2015 Prins ..................... C02F 3/2846
(Continued)

FOREIGN PATENT DOCUMENTS

EP    0776864 A1    6/1997
EP    2163525 A1    3/2010
(Continued)

OTHER PUBLICATIONS

International Search Report dated Feb. 27, 2018 for International Patent Application No. PCTEP2017083398 filed Dec. 18, 2017.

*Primary Examiner* — Fred Prince

(74) *Attorney, Agent, or Firm* — Foley & Lardner LLP

(57) ABSTRACT

A process for aerobic treatment of wastewater is provided, which process comprises: (a) supplying a liquid influent comprising wastewater to a reactor containing granular biomass; (b) subjecting the reaction mixture to aerobic conditions comprising a concentration of dissolved oxygen from 0.1 mg/L to 4.0 mg/L, and a hydraulic retention time from 0.5 to 72 hours; (c) separating the reaction mixture into granular biomass and treated wastewater; and (d) recycling separated granular biomass to the reaction mixture. A bioreactor for the process is also disclosed, comprising a reaction vessel provided with an aeration means, a solids separation device with an inlet in the lower part of the reaction vessel having an outlet line for solids arranged to transport separated solids to a riser driven by airlift action and arranged to transport the solids to the upper part of the reaction chamber.

20 Claims, 3 Drawing Sheets

(51) Int. Cl.
*C02F 1/00* (2006.01)
*C02F 3/22* (2006.01)
*C02F 101/16* (2006.01)

(52) U.S. Cl.
CPC .......... *C02F 3/223* (2013.01); *C02F 2101/16* (2013.01); *C02F 2203/006* (2013.01); *C02F 2209/42* (2013.01); *C02F 2301/046* (2013.01); *Y02W 10/10* (2015.05)

(58) Field of Classification Search
CPC ........... C02F 2209/42; C02F 2301/046; B01D 21/0045; Y02W 10/15
USPC ................ 210/605, 620, 513, 630, 623, 260
See application file for complete search history.

(56) References Cited

U.S. PATENT DOCUMENTS

| | | | |
|---|---|---|---|
| 2012/0234754 A1* | 9/2012 | Yatsugi ................ | C02F 3/1273 210/620 |
| 2013/0206684 A1* | 8/2013 | Prins .................... | C02F 3/1226 210/608 |
| 2016/0052811 A1* | 2/2016 | Hendrickx ............. | C02F 3/307 210/603 |

FOREIGN PATENT DOCUMENTS

| | | |
|---|---|---|
| EP | 2394966 A1 | 12/2011 |
| WO | WO-2000/005167 A1 | 2/2000 |
| WO | WO-2008/141413 A1 | 11/2008 |
| WO | WO-2012/005592 A1 | 1/2012 |
| WO | WO-2014/171819 A1 | 10/2014 |

* cited by examiner

AERATED REACTOR WITH INTERNAL SOLIDS SEPARATION

CROSS-REFERENCE TO RELATED PATENT APPLICATIONS

This application is a continuation of International Application No. PCT/EP2017/083398 filed on Dec. 18, 2017, which claims priority to European Application No. 16204837.5, filed on Dec. 16, 2016. The specification, drawings, claims and abstract of the prior applications are incorporated herein by reference in their entireties.

FIELD OF THE INVENTION

The present invention relates to a bioreactor and a process for aerobic treatment of wastewater involving granular biomass, in particular for treatment of ammonia-containing waste-water involving granular biomass having a core of anaerobic ammonium oxidising microorganisms.

BACKGROUND

Aerobic reactions including granular bacteria are well known in the art. Examples include aerobic COD treatments using granular aerobic sludge (Nereda® system), aerobic polishing using air-lifted biofilms on a carrier (Circox® system), sulfide-oxidising reactions and ammonia-oxidising ("Anammox") reactions. A problem with such reactions, in particular if performed in a single reactor, is the occurrence of competing non-granular micro-organisms, which may lead to unwanted side-reactions. For example, oxidation of ammonia to, eventually, dinitrogen and water, by partial aerobic oxidation of ammonia to nitrite and further anaerobic (anoxic) oxidation of ammonia with nitrite to molecular dinitrogen by Anammox bacteria, may suffer from further oxidation of nitrite to nitrate by nitrate-forming microorganisms present in non-granular biomass. Also, granular biomass is often susceptible to deterioration resulting from shear forces used to circulate the sludge through the reactor, leading to reduced conversion rates.

Single-reactor processes for oxidation of ammonia to dinitrogen using Anammox bacteria are disclosed e.g. in WO 00/05167 and EP 2163525. These processes have in common that granular biomass containing the desired anaerobic ammonia-oxidising, nitrite-consuming (Anammox) bacteria and aerobic nitrite-forming bacteria are preferentially retained in the bioreactor by selective separation and recycle. However, the processes can be hampered by loss of granules from the bioreactor system through granules flotation, associated with aging and density reduction. Also treating wastewater having variable fluxes and ammonia loads with these systems causes difficulties, because alternated aeration can harm the selection of granules due to high variations in settling conditions. Furthermore, commonly used biomass separation devices require a minimum water depth of at least 6 meters, which makes application in lower height tanks impossible.

EP 0776864 discloses an aerated purification reactor using granular active sludge. Sludge is separated by inclined partitions at the top of the reactor, effluent being discharged at the top of the reactor and separated sludge being recycled to the reactor in a downward movement.

WO2014/171819 discloses a process for biologically removing ammonia from wastewater at temperatures of 5-25° C. using granular sludge containing Anammox bacteria under shear conditions provided by aeration. Granular sludge is separated from liquid effluent and recycled using an inclined plate settler with relatively high upward liquid flow rates of 3-15 m/h.

SUMMARY OF THE INVENTION

The present invention aims at providing a reactor and a process for treating wastewater using granular bacterial biomass with better retention of the granules, and hence better efficiency, and with the possibility to adapt the process to lower influent rates by allowing variation of the level in the reactor and alternative aeration cycles. The present invention uses low-shear action such as airlift action instead of high-shear pumps for recycling granular biomass, and thus it reduces damage to the granules.

According to the present invention, such a reactor is an aerated reactor having a solids separator at the bottom. The separator has its inlet well below the effective or maximum reactor height and a solids outlet at a location where solids are recycled by upward movement in the reactor. According to the invention, such a process is provided in which the granular biomass is separated from the treated wastewater in the lower part of the reactor. This provides freedom at the surface of the reactor content, avoiding the need for frequent cleaning and allowing fluctuating flow rates and reactor water levels. As a result of the higher pressures occurring in the lower reactor part and the possibility to cover the reactor, aged and gas-filled granules are prevented from escaping the reactor. Hence, lower reactor water levels without excessive degassing and with effective liquid-solid separation can easily be accommodated.

While alternative on-off aeration results in variations of the water level, leading to sudden and temporary liquid displacement through an overflow separation device, the pressure of the water column does not vary in those periods. In the present invention, this allows for a continuous and stable effluent outlet flow, at the same flow as the influent, even during alternative aeration.

BRIEF DESCRIPTION OF THE DRAWINGS

The present invention will be discussed in more detail below, with reference to the attached drawings, in which.

DETAILED DESCRIPTION

Figure 1:
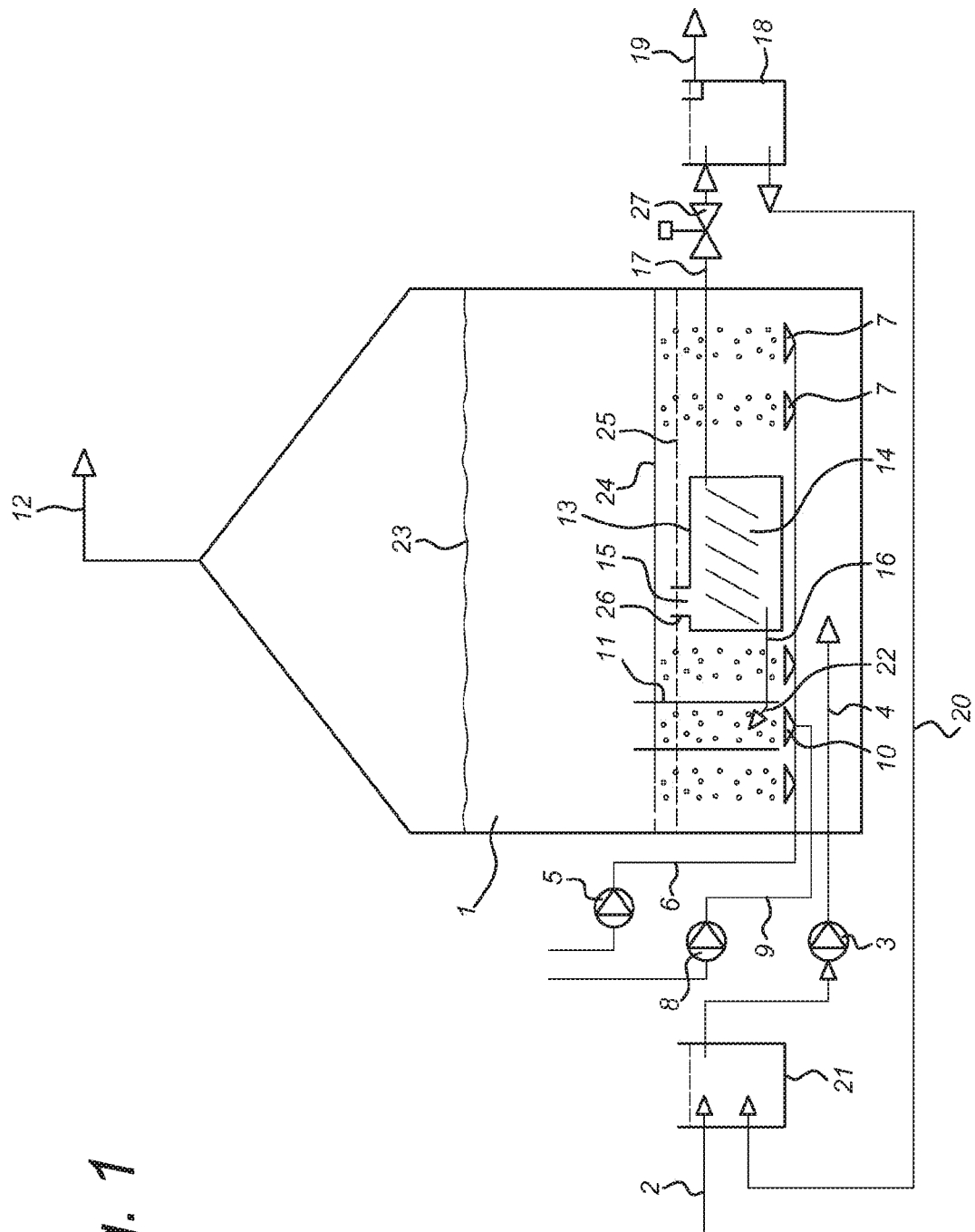
FIG. 1 depicts a reactor of the present disclosure.

The present disclosure generally relates to a bioreactor as defined in the appending claim 1 and to a process as defined in the appending claim 12.

More specifically, a bioreactor for aerobic treatment of wastewater is disclosed herein, comprising:

a reaction vessel comprising a liquid inlet and a gas outlet, the reaction vessel having a lower part which is below half of the effective height of the reactor vessel;

means for upward moving of reactor content including one or more aeration means located in the lower part of the vessel;

a solids separation device for separating solids from liquid located in the lower part of the reaction vessel, comprising a liquid inlet, a liquid outlet and a solids outlet;

the liquid inlet of the solids separation device being located at a height of less than 75% of the effective height of the reactor vessel, into the solids separation device, the liquid outlet of the solids separation device being connected to a liquid outlet line exiting the reactor vessel, and the solids outlet of the solids separation device being connected to a solids outlet line ending above the means for upward moving of reactor content, e.g. above a part of the lower part of the reactor vessel where the aeration means are located.

Also, a process for aerobic treatment of wastewater is disclosed herein, which comprises the following steps:

(a) supplying a liquid influent comprising wastewater to a (continuously or intermittently) aerated reactor containing granular biomass to provide a reaction mixture;

(b) subjecting the reaction mixture to aerobic conditions comprising a concentration of dissolved oxygen in the range of from 0.1 mg/L to 4.0 mg/L, and a hydraulic retention time in the range of from 0.5 to 72 hours;

(c) separating reaction mixture into granular biomass and treated wastewater (i.e. the granular biomass is separated from the reaction mixture); and (d) recycling separated granular biomass to the reaction mixture, characterised in that in step (c) the granular biomass is separated from the reaction mixture in the lower part of the reactor, at a hydrostatic pressure of at least 0.2 bar, and in step (d) granular biomass is recycled to the reaction mixture by upward movement inside the reactor, i.e. inside the reaction mixture.

As described herein, "granular sludge" or "granular biomass" comprises solids in granular form or in another, e.g. flocculent, form which can be effectively separated from aqueous liquid by gravity, by being sufficiently coherent and having a higher density than water, and which contains microorganisms such as bacteria, archaea or the like. Accordingly, "non-granular sludge" or "non-granular biomass" refers to sludge or biomass which is not in granular or other form allowing effective separation by gravity. Where reference is made herein to bacteria, other microorganisms, such as archaea, having similar activities, are considered to be included. As used herein, "aerobic treatment" or wastewater refers to subjecting the wastewater to microorganisms, which include aerobic, i.e. oxygen-dependent, microorganisms, but which also comprises subjecting to mixed, i.e. aerobic and anaerobic, microorganisms and conditions. The terms (liquid) reactor content, reactor liquid, reaction mixture and the like are used herein interchangeably to refer to the non-separated, essentially liquid (though containing solids and gas as well) content of the bioreactor when in use.

As described herein, a "lower part" or "lower section" of the reactor where the granular biomass is separated is the part which is below half of the effective height of the reactor, preferably below 40%, more preferably below 30%, most preferably between 5 and 25% of the effective height of the reactor. The lower part corresponds in particular to a part of the reactor which has a significant height of the reactor content above it, in particular a height which corresponds to a hydrostatic pressure of at least 0.2 bar, preferably at least 0.3 bar, more preferably at least 0.4 bar, at the point where the sludge-wastewater, i.e. solids-liquid, separation takes place. This in turn corresponds to a liquid height above the solids-liquid separation of at least 2 m, preferably at least 3 m, more preferably at least 4 m. This liquid height can be variable to allow a reduction of the effective reactor volume in the event of low influent supply, so as to maintain a low HRT (for example during off-season or weekend operation). When using varying liquid levels in the reactor as further explained below, the hydrostatic pressure at the separation level is still preferably at least 0.2 bar, corresponding to a liquid height of at least 2 m, at the lowest reactor liquid level and preferably at least 0.3 bar (3 m height), or even at least 0.4 bar, up to e.g. 0.8 or even 1.0 bar at the highest reactor liquid level.

As used herein, "effective reactor (vessel) height", "height of (liquid) reactor content", "maximum reactor (water) level" and the like, are used interchangeably to denote the highest practical level of the reactor liquid content. As will be immediately appreciated by the skilled person, the "maximum height" or "highest practical level" is the level above which the reactor cannot be operated without interfering with the reactor processes, e.g. where there is a change in vessel diameter such as where vertical walls end. Total reactor heights—i.e. independent of the height of the reactor content—can vary depending on the particular treatment, e.g. from 3 to 12 m, more in particular from 4 to 10 m.

The reactor is continuously or discontinuously aerated by means of the aerators in the lower section of the reactor. Preferably, the aerators are not evenly distributed over the lower section of the reactor, so that more intensively aerated zones with substantial upward movement of reaction mixture are created in vertical zones above the part(s) of the bottom part where aerators, and less intensively or non-aerated zones above with substantial downward movement of reaction mixture are created in vertical zones above part of the bottom section where less or no aerators are located. This result is a desired vertical (air-lift) loop reactor and process type, with alternating aerated and non-aerated stages, promoting aerobic and non-aerobic (anoxic) reaction conditions, respectively.

In process step (c), the granular biomass is preferably separated from the reaction mixture in a solids separation device as further described below. The solids separation device may be placed at the bottom of the reactor, or slightly above the bottom, or even below the bottom, e.g. in a deepening in the reactor bottom plate, so that only a part of the solids separation device is above the bottom level of the reactor. Thus, the lower part of the reactor where the granular biomass is separated from the reaction mixture, i.e. below 50%, preferably below 40% etc. of the effective reactor height, particularly refers to the level within the solids separation device where solids are separated. Where the separation device involves inclined structures as referred to below, the separation level, i.e. the lower part, is understood as the height of the middle of the inclined structures.

A suitable solids separation device is a so-called bottom settler, e.g. as described in WO 2012/005592. The separation device preferably comprises a series of parallel inclined (oblique) structures, such as plates, pipes or grids, to enhance separation efficacy, as further explained below. As different from the teaching of WO 2012/005592, treated liquid from the reactor (reaction mixture) is collected at the inlet of the solids separation device which is positioned at a height in the reactor which is preferably above the biomass bed (i.e. above about 20-30% of the reactor height) and is fed to the solids separation near the bottom of the reactor, where it is separated from (granular) biomass and is partly or wholly discharged, or partly recycled to the reactor. The separated (granular) solids are partly or wholly recycled to the reactor, preferably using a riser driven by airlift action.

The supply of wastewater in step (a) may advantageously be performed continuously, while allowing fluctuations in influent rates. As a consequence, the separation of granular biomass and the provision—and discharge—of treated wastewater in step (c) are also advantageously continuous. The supply, and optionally the separation and discharge, may also be done intermittently, e.g. to allow settling of biomass, for relatively short periods of time.

The reactor can be aerated intermittently, i.e. the reactor can have a phase during which it is aerated, and a phase during which aeration is interrupted to allow for anoxic conditions. During the aerated phase, when the reactor is fully mixed by means of aeration, the treated wastewater together with granular biomass is collected and fed to the solids separator. During the non-aerated phase, the granules will settle into a bed which can be below the inlet of the solids separation device. This means that only treated wastewater will then leave the reactor, as granular biomass cannot enter the solids separation device. As a means for upward moving of reactor content, a separate blower or pump can be present to facilitate the return of the granular biomass from the separation device to the reactor by means of air-lift.

In order to level off variations in wastewater supply, a part of the treated wastewater separated in step (c) can be recycled and added to the liquid influent supplied in step (a), and then only the remaining part is discharged. If desired, unwanted biomass such as nitrite-oxidising bacteria, which tends to be flocculent, can be deactivated in this recycle line by settling, filtration or UV irradiation or the like. This option is especially advantageous at relatively long HRT's of more than 12 h, in particular more than 24 h, especially more than 36 h. The ratio of recycled to discharged treated wastewater is determined on the basis of the supply levels and their variation. The ratio can broadly be between 0 and 0.9, e.g. between 0.1 and 0.8, or more particularly between 0.2 and 0.5.

The granular biomass recycled to the reactor in step (d) is recycled by upward movement inside the reactor. This means that the biomass separated in step (c) inside the reactor is fed directly to one or more locations inside the reactor in the lower part thereof where an upward movement is arranged. In particular, the separated and recycled biomass does not leave the reactor and is fed to the location with upward movement without bridging substantial height differences. The granular biomass is preferably recycled by using low shear. This is achieved by using low-speed liquid or gas jets, or low-shear pumps, in particular by airlift action. When using liquid for recycling separated granular biomass in upward movement, reaction liquid or preferably fresh influent, or a recycled part of reactor effluent can be pumped as a motive liquid to move biomass upward from the outlet of the solids separation device. High-shear jets, pumps and the like are preferably avoided to minimize shear-induced damage to the granules. As used herein, "low shear" means shear values below 750 s$^{-1}$, especially below 500 s$^{-1}$, e.g. down to 50 s$^{-1}$.

In airlift recycling, the granular biomass can be introduced in an aerated zone of the reactor, i.e. the means for upward moving of reactor content (including separated solids) are provided by one or more aerators. Thus the separated granular biomass can be introduced just above the one or aerators, e.g. within 1 m above the aerator(s). For that purpose, intensively aerated zones can be separated from non-(or less intensively) aerated zones for a (lower) part of the height of the reactor by vertical walls having a cylindrical or other shape. Alternatively and preferably, the aerated zones are not separated by walls, and focussing of the recycled granular biomass in the aerated upflow is achieved by having the solids outlet of the separation device directed away from the nearest non-aerated zone, more preferably in an upward direction, as described in WO2015/047091.

Alternatively, or additionally, a dedicated aerator, such as a blower, can be placed below the solids outlet of the solids separation device (or the collector thereof) as a means for upward moving of reactor content, and a riser column can be arranged above the dedicated aerator so as to convey the solids, comprising the granular biomass, to the upper part of the reactor and the upper levels of the reactor content. Such a dedicated aerator can be advantageous to make the recycling of granular biomass by airlift independent of the air supply needed for keeping the reactor content aerobic at the required level.

The hydraulic retention time (HRT) in the reactor is at least 0.5 h, preferably at least 1 h, up to 72 h, preferably up to 48 h, more preferably up to 24 h, most preferably below 12 h or even below 8 h. In the reactor, the granular sludge preferably has a sludge retention time (SRT) of at least 4 times the HRT, preferably between 10 and 50 times the HRT. Thus, the SRT for granular biomass is at least 2 hours, preferably at least 12 hours, more preferably at least 2 days, up to e.g. 60 days, preferably up to 42 days, most preferably up to 30 days.

The reactor is preferably covered at the top in order to allow a controlled discharge of gases, possibly involving further treatment. If desired, spent gas can be collected at the top of the reactor and partly recirculated to the aerator when the airflow required for mixing is higher than the airflow required to provide oxygen to the bacteria.

In a particular embodiment, the level of the reactor content can be varied, so as to accommodate lower influent rates. This can be arranged by incorporating a control valve that controls the outflow rate of the treated wastewater, controlled by a level detector that measures the water level inside the reaction vessel, as further illustrated with reference to FIG. 2 below.

Aerobic treatment processes that can be performed with the process and the reactor of the invention include any processes in which granules or flocculent equivalents containing desired microorganisms are used. As an example, biological oxidation of sulfide to elemental sulfur using sulfur particles as described in WO94/29227 (EP0702663) can advantageously be carried out using the present invention. Another example is aerobic treatment of readily biodegradable COD by poly-hydroxyalkanoate-producing microorganisms as described e.g. in WO2011/073744 and WO2015/181083.

The present invention is especially suitable for the treatment of ammonia-containing wastewater, wherein ammonia is partly oxidised to nitrite in the presence of molecular oxygen (nitritation reaction), and partly oxidised anaerobically to molecular nitrogen (dinitrogen) in the presence to the nitrite formed (Anammox reaction). This process involves granular biomass which comprises anaerobic ammonia-oxidising (Anammox) bacteria. In particular, the granules have a core of anaerobic ammonia-oxidising (Anammox) bacteria and an outer rim of aerobic ammonia-oxidising microorganisms (bacteria and/or archaea).

Thus, the invention in a particular embodiment pertains to a process for aerobic treatment of wastewater containing ammonia, which comprises the following steps:
(a) continuously or intermittently supplying a stream of the wastewater to an aerated reactor containing biomass comprising granules having a core of Anammox bacteria and an outer rim of aerobic ammonia-oxidising nitrite-producing bacteria, to provide a reaction mixture;
(b) subjecting the reactor mixture to ammonium-oxidising conditions comprising a concentration of dissolved oxygen in the range of from 0.1 mg/L to 4.0 mg/L, and a hydraulic retention time in the range of from 0.5 to 72 hours;
(c) separating the reaction mixture into granular biomass and treated wastewater; and
(d) recycling separated granular biomass to the reaction mixture,
characterised in that in step (c) the reaction mixture is separated in the lower part of the reactor, and in step (d) granular biomass is recycled to the reaction mixture by upward movement inside the reactor, preferably using low shear.

In the process wherein the wastewater contains ammonia and the biomass comprises granules having a core of Anammox bacteria and an outer rim of ammonia-oxidising microorganisms, the aerobic conditions preferably comprise a concentration of dissolved oxygen of 0.2 mg/L to 2.0 mg/L, more preferably of 0.3 to 0.7 mg/L. While a broad range of ammonia concentrations can be handled in such as process, the wastewater preferably contains at least 20 mg ammonia (expressed as nitrogen) per L, up to e.g. 4000 mg/L, more preferably at least 50 mg/L, even more preferably between 200 and 2000 mg ammonia (expressed as nitrogen) per L. Higher levels can conveniently be treated by appropriate dilution using treated effluent also as diluent, possibly after disinfection by settling, filtration, UV irradiation, or the like as described above.

In a process of treating ammonia-containing wastewater, the reactor will further comprise non-granular biomass comprising less-desired, or undesired microorganisms, such as nitrite oxidising bacteria. The retention time of the non-granular biomass is then preferably no more than 3 times the hydraulic retention time and less than 0.2 times the retention time of the granular sludge. More preferably, retention time of the non-granular sludge is no more than 2 times the hydraulic retention time and less than 0.1 times the retention time of the granular sludge. For example, the retention time of non-granular biomass can be between 0.5 and 48 u, in particular between 1 and 36 u.

The bioreactor for the aerobic treatment of wastewater as disclosed herein is in particular a continuously, or discontinuously aerated reactor comprising:
a reaction vessel comprising a liquid inlet and a gas outlet; in addition, the reaction vessel has a liquid outlet which is provided through the solids separation device described below;
one or more aeration means located in a lower section (part) of the reactor vessel, especially in only a part of the lower (bottom) section thus leaving another part, i.e. one or more areas, of the bottom part without aerators, and thus, in operation, resulting in non-aerated, and hence relatively quiet zone(s) above those one or more areas;
optionally additional means for upward moving of reactor content (liquid and solids) in the lower section of the reactor vessel;
a solids separation device located in a lower section of the reaction vessel arranged to separate solids from liquid, comprising a liquid inlet at the top, a liquid outlet and a solids outlet;
the liquid inlet of the solids separation device being located at a height of less than 75% of the effective height of the reactor vessel,
the liquid outlet of the solids separation device being arranged to pass separated liquid from the solids separation device to outside the reactor vessel, i.e. the outlet being connected to a liquid outlet line exiting the reactor vessel, and
the solids outlet of the solids separation device being arranged to pass separated solids from the solids separation device to a zone in the reactor vessel above the aeration means, i.e. the outlet being connected to a solids outlet line ending above the part where the aeration means are located, and/or to a zone above the optional further means for upward moving of reactor content, such as a blower of a pump outlet.

In particular, the liquid inlet of the solids separation device is arranged to pass reaction mixture from a zone of the reactor vessel which is not aerated into the solids separation device. Thus the inlet is preferably located outside vertical zones above the aeration means, i.e. above the part of the reactor vessel where the one or more aeration means are not located; alternatively it can be located directly above (the main body of) the solids separation device, which is a non-aerated vertical as a result of the shielding effect of the device.

With reference to the solids separation device of the bioreactor, the "lower part" or "lower section" is in particular below 50%, preferably below 40%, more preferably below 30% of the effective reactor height as described above with reference to the process. The one or more aeration means and optional additional means for upward movement are also located in the lower part and preferably at a height which is lower than the middle height of the separation device, in particular of (inclined) separation structures within the device. In the reactor of the present disclosure, the reaction vessel preferably has its liquid inlet also in a lower part of the vessel, so as to assist in the vertical circulation of the reaction mixture. The lower part where the liquid inlet is located is not necessarily at the same level as the solids separation device; the height of the liquid inlet of the reaction vessel may be above the aeration means, i.e. within the aerated zones; it may also be below the aeration means. The gas outlet of the reactor is located above the effective reactor content height, in particular at the top. In an embodiment, the reactor is not covered at the top and the open top constitutes the gas outlet. However, the reactor is preferably covered at the top and is provided with a dedicated outlet allowing the exiting gas to be guided by single or multiple lines. The reactor also has a liquid outlet connected to the liquid outlet of the solids separation device for discharging treated waste water and optionally for recycling part of the treated wastewater to the reactor.

The aeration means are preferably located in a part of the lower part (section) of the vessel, a further part not being provided with aeration means. They are arranged to provide vertical aerated reactor zones above the aeration means and non-aerated reactor zones between the aerated reactor zones. Preferably the aeration means are located in a zone of the reactor vessel outside, vertically speaking, the lower part where the solids separation device is located. The aeration means may be a single aerator at the bottom of the reactor providing a single vertical aerated zone above the aerator, the remaining zone of the reactor vessel being a non-aerated zone. Alternatively, the aeration means may be a plurality of aerators providing essentially the same plurality of aerated zones, with non-aerated zones in between. The single aerated zone, or the plurality of aerated zones, may be separated from the non-aerated zone(s) by vertical walls extending over a part or essentially the total height of the effective reactor height; however, in an embodiment, such vertical walls can be relative short (e.g. less than 20% of the reactor height) or can even be completely dispensed with. As a further alternative, the entire lower part of the reactor vessel may be evenly or quasi-evenly aerated with the exception of one or more sites which are not aerated. In particular, the site where the separation device is located is not aerated, and thus at least the zone above the separation device is a non-aerated zone and it may even be a single non-aerated zone—, from which reaction mixture is collected for passing it to the separation device.

The solids separation device in the lower part of the reaction vessel is arranged to separate solids from liquid. It comprises a liquid inlet arranged to pass reaction mixture from a zone of the reactor vessel which is outside vertical zones above the aeration means, i.e. to introduce liquid from a non-aerated reactor zone—e.g. above the separation device—into the solids separation device, a liquid discharge (outlet) arranged to remove separated liquid from the solids separation device as a reactor effluent, and a solids outlet line. The solids outlet line ends in the lower part of one or more aerated reactor zones such that the solids are transported upward in the reaction vessel. The upward transport preferably involves low-shear action, in particular by the solids outlet line being connected to (low-speed) liquid or gas flows or jets, e.g. using liquid influent as lifting means, or, more preferably, airlift action resulting from aeration. Thus, the solids outlet can be provided with a means (pump, blower, nozzle) for producing liquid or gas flows for upward movement of the solids, in particular above one or more aerators.

Suitably, part of the effluent (liquid separated from the solids separation device) can be recycled with the influent to control the upflow velocity in the solids separator independently of the variations in the influent flow. This allows for continuous feeding and level regulation between effluent and influent tanks.

The solids separation device can comprise a housing having a fluid inlet (also referred to herein as liquid inlet) for introducing a liquid/solids or a gas/liquid/solids mixture. It can further comprise a particulate material separation arrangement and a liquid outlet for removing separated liquid from the solids separation device, the liquid outlet being positioned downstream from the particulate material separation arrangement.

The solids separation device is located on or near the bottom of the reactor vessel and is supported by support legs or suspended from a vessel wall. The fluid inlet of the solids separation device is preferably located at a height which exceeds the height of the granular biomass bed, which is typically about 20-30% of the maximum effective height of the reactor vessel. On the other hand, the inlet is below the lowest effective height of the reactor contents (reaction mixture) in the embodiment where the reactor is equipped with means for varying the height of the reactor content to accommodate fluctuations in supply volume or supply characteristics. Thus (the upper end of) the inlet is at a height below 95% of the effective reactor height, preferably below 75%, more preferably below 55%, or even below 45% of the effective reactor height; the lower heights are advantageously applied when varying liquid levels in the reactor are accommodated. In order to be above the separator device and above the level of settling sludge when aeration is interrupted, the liquid inlet of the separation device (upper end) is preferably above 10%, in particular above 15%, more preferably above 20%, even more preferably above 25% of the effective reactor height. Thus the fluid inlet height is preferably between 20 and 95% of the effective reactor height, more preferably between 25 and 75%, even more preferably between 30 and 55% and most preferably between 33 and 45% of the effective reactor height (maximum filling height). The inlet is preferably provided with a means to allow gas to escape before the fluid enters the separation device, such as a degassing unit.

When the solids separation device is placed at the bottom of the reaction vessel, this advantageously gives the largest height difference between the top end of the fluid inlet, and the solids separation device where the fluid is separated. An advantage of placing the solids separation device inside rather than outside the vessel is that the pressure inside the solids separation device and in the surrounding part of the vessel is equal, so that there is no need to fortify the solids separation device to handle pressure differences. Another advantage is that the solids outlet of the separation device can be directly near an upward moving part of the reactor content (e.g. aerated zone), so that the need for pipes is minimised, also removing the need for horizontal pipes going outside and back inside the vessel. An advantage of having few and/or short pipes only, if any are needed at all, is that the risk of clogging due to settling of solids is minimised and that costs for wall penetrations are avoided.

The solids separated from the (fluid) reaction mixture by the solids separation device may be advantageously collected in a solids collection chamber prior to being reintroduced into the reactor vessel. The solids collection chamber can be provided with means for removing collected or received material from the solids collection chamber. The solids collection chamber comprises one or more exits for fluid containing particulate material for return into or in the direction of the reaction vessel. Separated solid material is recirculated into the reaction vessel.

In an embodiment, particulate material is removed from a solids collection chamber of the solids separation device by a suction effect created by a further flow of influent or a mixture of recycled and influent fluid into the reaction vessel. The fluid (liquid) inlet system of the reactor can thus serve at least two purposes: It brings influent or a mixture of influent and recycled material into the reactor vessel, and in doing so, the transport of the material from the outlet opening into the reactor near the separation device will cause a suction effect that transports separated particulate material out of the solids collection chamber into the reaction vessel, preferably through an air-driven riser as further described below, or through a liquid forwarding means (pump, nozzle or the like).

In a preferred embodiment, the solids separation device comprises angled wall parts that, going from top to bottom, taper outwards towards the sides of the reaction vessel. Advantageously, these angled wall parts can form a tent-like structure inside the reaction vessel. Biomass that descends from higher parts of the reaction vessel may slide off the angled wall parts in the direction of the influent nozzles, thus minimising the risk of unmixed zones on the bottom of the reactor. In particular, the separator comprises a row of inclined parallel structures, such as plates, pipes, grids or the like, forming channels. The row of inclined structures functions as a particulate material separation arrangement. The channels formed by these structures separate fluid that passes through them. The inclination of the inclined structures compared to the horizontal plane is sufficient to provide sufficient downward movement, while compared to the vertical plane it is sufficient to allow effective separation of solid particles. The inclination is generally between 15 and 75°, preferably between 30 and 60° with respect to the horizontal plane. Particulate matter will tend to flow downwards, while liquid materials tend to flow up the inclined channels. The inclined parallel plates of the solids separation arrangement can be constructed and arranged to cause a flow in the upward direction from the solids collection chamber to the liquid discharge of the solids separation device. The particulate (granular) or sludge-like material is collected in the solids collection chamber while the recycled, cleaned, liquid material can be discharged from the solids collection chamber and eventually from the reactor via the liquid discharge.

As described above, the fluid inlet of the solids separation device advantageously comprises a gas separation device. The gas separation device will allow gaseous material from the liquid to escape by upward movement, further reducing the gaseous content of the fluid that is subsequently collected and brought towards the solids separation device. The gas separation device may also be integrated with a solids separation device. Such an array e.g. comprises a set of slanting (oblique) lamellae with slow downward liquid flow allowing gas to escape upwards in a degassing zone of the separation device, and another set of slanting lamellae at the same of different height with slow upward liquid allowing granules to settle and be carried off in a solids settling zone of the separator device, the degassing chamber (zone) and the settling chamber (zone) being partly separated by a dividing wall which is interrupted at the bottom end, as described in WO2010/036107. This is diagrammatically depicted in FIG. 3 below. By having the gas separation in the inner (lower) part of the reactor, in particular when integrated with the solids separation device, rather than at the surface of the reactor content as is conventional, the upper surface is free of fixed devices such as inlets, outlets and separators. This allows the surface to freely move upward and downward to adapt to fluctuating influent rates and/or fluctuating reactor charges and thus to optimise reactor and process efficacies.

The bioreactor preferably has a height of between 3 and 12 m, and/or the maximum reactor level content preferably has a height of 4-10 m. The (liquid) reactor content can have a variable height e.g. from about one third of the reactor height to the maximum effective height, e.g. from about 3 to 9 m for a reactor of 10 m high, or from about 2 to 4.5 m for a reactor of 5 m high. Thus, the height of (the liquid inlet of) the solids separation device from the bottom level of the reactor is preferably less than the minimum filling level of the reactor, e.g. 1.5-3, especially 1.8-2.5 m for a reactor of 10 m high. The horizontal cross-section of the reactor can be of any shape, e.g. square, polygonal or, preferably, circular.

FIG. 1 depicts a bioreactor according to the present disclosure. Reactor 1 has an influent supply 2, which, through a mixing tank 21 and a pump 3 supplies liquid influent into the reactor through liquid distributor 4. The effective height of the reactor, i.e. the maximum practical liquid level, is from the bottom to the level where the vertical walls end, and the upper conical air space begins. The reactor is aerated by means of air supply and blower 5, gas inlet line 6 and gas distributors 7, which together form exemplary aeration means. An optional dedicated air supply and pump 8 introduces air through line 9 to additional gas injector 10 (also forming an exemplary aeration means) below a riser column 11. Gas is discharged from the reactor through outlet 12. A bottom separator 13 containing inclined plates 14 for separating solids from liquid is placed in the lower part of the reactor and is properly supported (not shown). Reactor liquid is fed to the separator 13 through inlet 15, which preferably has its upper end above the biomass level 25, which forms when aeration is interrupted. If necessary, the upper part of the inlet 15 is an upwardly extending pipe 26 so as to raise the inlet point above the biomass rest level 25. Collected solids (granular biomass) are conveyed through line 16 to solids outlet 22 above the gas injector 10 below the riser column 11. Liquid separated in separator 13 is collected and conveyed through line 17 to an effluent collector tank 18, from which effluent is discharged through overflow 19. A part of the effluent may be returned to influent mixing tank 21 through return line 20. The reactor water level 24 may vary between a higher level 23 and a lower level 25 using a control valve 27 as further explained with reference to FIG. 2. As depicted herein, the higher level 23 is slightly below the maximum practical level of the reactor.

Figure 2:
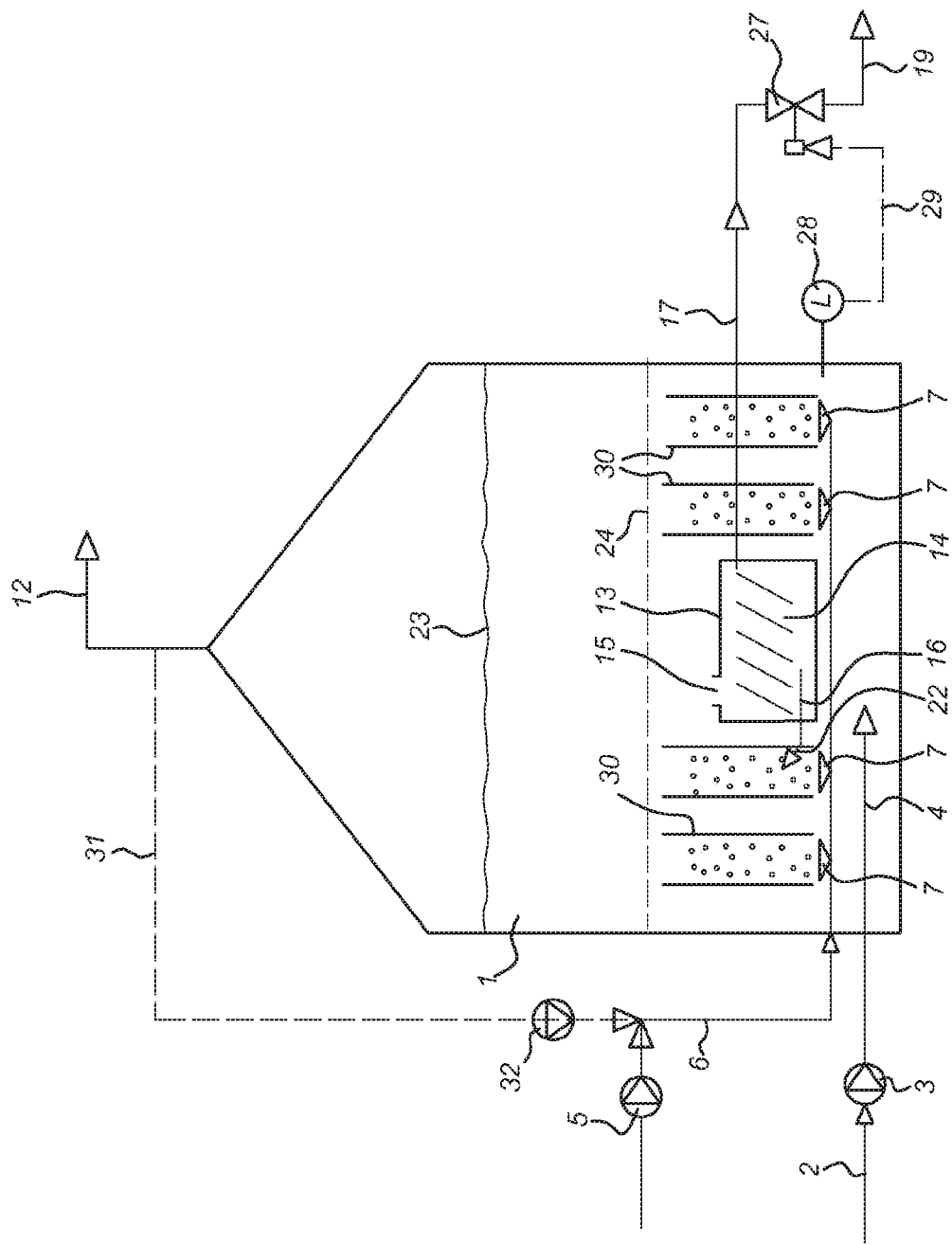
FIG. 2 depicts another reactor of the present disclosure having alternative features.

FIG. 2 similarly depicts another embodiment of the bioreactor according to the present disclosure. Similar parts between FIGS. 1 and 2 have the same reference numerals. Reactor 1 has an influent supply 2, which, through a pump 3, supplies liquid influent into the reactor through liquid distributor 4. The reactor is aerated as in FIG. 1, although in this embodiment the dedicated aerator 10 is omitted. A bottom separator 13 with inclined plates 14 and inlet 15 is placed in the lower part of the reactor. Collected solids (granular biomass) are conveyed through line 16 to solids outlet 22, which in this embodiment is located above one (or more) of the regular distributors 7. In this embodiment, the columns above the gas distributors 7 are separated by cylindrical walls 30 assisting in defining aerated and non-aerated zones within the reactor. Liquid separated in separator 13 is collected and conveyed through line 17 to a controllable valve 27 for adjusting the reactor liquid level 24 between the maximum level 23, and the biomass rest level (not shown here), and eventually discharge 19. Part of it may be recycled as depicted in FIG. 1, but not shown here. The effluent control valve 27 is controlled by a level measurement 28 that continuously measures the level in the reaction vessel and transmits the measurement through line 29. An optional gas return line 31 with controllable valve and/or pump 32 allows adjusting the gas flow, in case the gas need is higher than the oxygen requirement.

Figure 3:
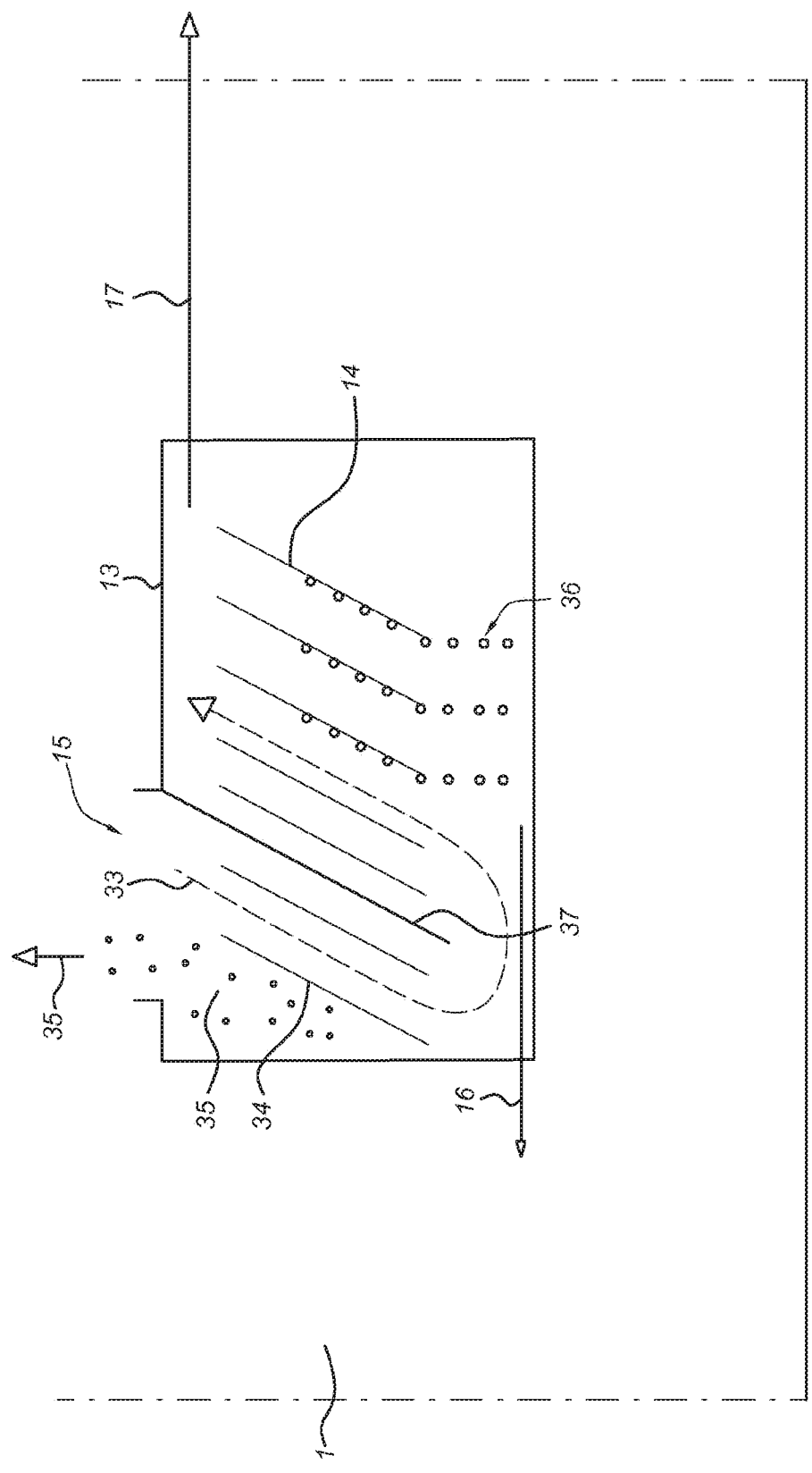
FIG. 3 depicts an integrated gas separation and solids separation device.

FIG. 3 depicts an integrated gas separation and solids separation device 13, having an upper entrance 15 for reaction mixture to be separated. The flow of the mixture through the integrated separator is indicated by arrow 33. The mixture first passes downward through oblique lamellae 34 in a degassing zone allowing gas to be separated from the liquid and solids and be discharged upward along 35. After having passed oblique dividing wall 37, the degassed mixture passes upward through oblique lamellae 14, allowing solids to settle as 36 and to be recycled through 16 at the bottom of the separator. The degassed, cleared liquid is then carried off at the top of the separator through 17.

EXAMPLES

Example 1

An industry is producing wastewater of varying flow rates due to seasonal variations in the industry's activity. Ammonium in the industry's wastewater is to be treated by means of the Anammox process using granular biomass. While the maximum flow is 1000 m³ per day or 40 m³ per hour, the flow is only 360 m³ per day or 15 m³ per hour during the periods of lower operation. The ammonium (NH4-N) concentration is relatively stable between the periods of high and lower activity at about 1000 mg per liter. While the reactor is designed to treat the maximum flow at an optimum hydraulic retention time (HRT) of 12 hours, keeping the volume would mean a higher HRT during low feed period, of 33 hours. While 33 hours of HRT is acceptable for the process, it would increase the risk of overpopulation of the reactor with unwanted biomass such as nitrite-oxidising bacteria (NOB). For that reason, the operational volume of the tank is decreased during the periods of lower feed with the water level decreasing from 8 to 4 meters. This results in a reactor volume decrease from 500 to 250 m³ while the granular retention device will remain operational. With the smaller reactor volume during low feed periods, the HRT in those periods is 17 hours, which is sufficient to prevent accumulation of NOB as they will be continuously flushed out of the reactor with the liquid discharge. Decreasing the volume also allows for a high enough volumetric loading rate (VLR) with 1.4 instead of 0.7 kgNm³·d while the VLR during high load remains at 2 kgN/m³·d. Alternative operation of the aeration equipment is necessary during the low flow period as the minimum output of the blower is higher than the aeration demand under low flow conditions.

What is claimed is:

1. A bioreactor for aerobic treatment of wastewater, comprising:
    (a) a reaction vessel comprising a liquid inlet and a gas outlet, the reaction vessel having a lower part which is below half of the effective height of the reactor vessel, wherein the effective height of the reactor vessel is the maximum reactor wastewater level;
    (b) one or more aerators located in the lower part of the vessel for upward moving of reactor content;
    (c) a solids separation device for separating solids from liquid, located in the lower part of the reaction vessel, comprising a liquid inlet, a liquid outlet and a solids outlet;
        (i) the liquid inlet of the solids separation device being located at a height of less than 75% of the effective height of the reactor vessel,
        (ii) the liquid outlet of the solids separation device being connected to a liquid outlet line exiting the reactor vessel, and
        (iii) the solids outlet of the solids separation device being connected to a solids outlet line ending above the one or more aerators for upward moving of reactor content.

2. The bioreactor according to claim 1, wherein the liquid inlet of the solids separation device is located at a height of less than 55% of the effective reactor vessel height.

3. The bioreactor according to claim 1, wherein the liquid inlet of the solids separation device is positioned directly above the solids separation device or above a part of the reactor vessel where the one or more aerators are not located.

4. The bioreactor according to claim 1, wherein the solids outlet of the solids separation device is capable of producing liquid or gas flows for upward movement of the solids.

5. The bioreactor according to claim 4, wherein the solids separation device comprises a series of parallel inclined structures.

6. The bioreactor according to claim 5, wherein the structure are lamellae or pipes.

7. The bioreactor according to claim 1, further comprising a gas separation device integrated in the solids separation device.

8. The bioreactor according to claim 1, wherein the solids separation device comprises an oblique dividing wall dividing the device into a degassing chamber comprising oblique lamellae below inlet and a solids settling chamber comprising oblique lamellae.

9. The bioreactor according to claim 1, wherein the reactor is covered at the top, apart from the gas outlet.

10. The bioreactor according to claim 9, wherein the reactor has a height between 4 and 12 m.

11. The bioreactor according to claim 1, wherein the liquid outlet line is connected to a control valve, which controls the rate of discharge of the separated liquid so as to adjust the level of the reactor content.

12. A process for aerobic treatment of wastewater, comprising:
    (a) supplying a liquid influent comprising wastewater to an aerated reactor containing granular biomass to provide a reaction mixture;
    (b) subjecting the reaction mixture to aerobic conditions comprising a concentration of dissolved oxygen in the range of from 0.1 mg/L to 4.0 mg/L and a hydraulic retention time in the range of from 0.5 to 72 hours;
    (c) separating the reaction mixture into granular biomass and treated wastewater; and
    (d) recycling separated granular biomass to the reaction mixture,
    wherein in step (c) the reaction mixture is separated in the lower part of the reactor at a hydrostatic pressure of at least 0.2 bar, and in step (d) granular biomass is recycled to the reaction mixture by upward movement inside the reactor.

13. The process according to claim 12, wherein in step (d) granular biomass is recycled to the reaction mixture using low shear.

14. The process according to claim 13, wherein the granular biomass is recycled to the reaction mixture using air lift.

15. The process according to claim 12, wherein the reactor is aerated at a part of a bottom area resulting in one or more vertical aerated zones and one or more vertical non-aerated zones and in step (d) granular biomass is recycled by introducing it into one or more aerated zones.

16. The process according to claim 12, wherein in step (c), reaction mixture is separated in a solids separation device and collected above the level of the granular biomass when the reactor is not aerated.

17. The process according to claim 12, wherein steps (a)-(d) are carried out continuously or intermittently, and/or a part of the treated wastewater provided in step (c) is recycled and added to the liquid influent supplied in step (a).

18. The process according to claim 12, wherein the granular biomass has a sludge retention time of at least 4 times the hydraulic retention time.

19. The process according to claim 12, wherein the wastewater contains ammonia, and the granular biomass comprises granules having a core of Anemoi bacteria and an outer rim of ammonia-oxidising nitrite-producing bacteria.

20. The process according to claim 12, comprising controlling a discharge of treated wastewater from the reactor to vary the level of the reaction mixture in the reactor.

* * * * *